(12) United States Patent
Ramos et al.

(10) Patent No.: US 11,885,699 B2
(45) Date of Patent: Jan. 30, 2024

(54) OPTICAL FIBER SYSTEM HAVING HELICAL CORE STRUCTURE FOR DETECTING FORCES DURING A COLLISION TEST

(71) Applicant: Humanetics Innovative Solutions, Inc., Farmington Hills, MI (US)

(72) Inventors: Rogerio Tadeu Ramos, Eastleigh (GB); Christopher Emslie, Romsey (GB)

(73) Assignee: Humanetics Innovative Solutions, Inc., Farmington Hills, MI (US)

(*) Notice: Subject to any disclaimer, the term of this patent is extended or adjusted under 35 U.S.C. 154(b) by 122 days.

(21) Appl. No.: 17/432,263

(22) PCT Filed: Feb. 20, 2020

(86) PCT No.: PCT/US2020/019048
§ 371 (c)(1),
(2) Date: Aug. 19, 2021

(87) PCT Pub. No.: WO2020/172413
PCT Pub. Date: Aug. 27, 2020

(65) Prior Publication Data
US 2022/0252474 A1    Aug. 11, 2022

Related U.S. Application Data

(60) Provisional application No. 62/808,039, filed on Feb. 20, 2019.

(51) Int. Cl.
*G01L 1/24*    (2006.01)
*G01L 5/00*    (2006.01)
(Continued)

(52) U.S. Cl.
CPC ............ *G01L 1/246* (2013.01); *G01L 5/0052* (2013.01); *G02B 6/02128* (2013.01); *G09B 23/32* (2013.01)

(58) Field of Classification Search
CPC ... G01L 1/246; G01L 5/0052; G02B 6/02128; G09B 23/32; G09B 23/30; G01M 17/0078
See application file for complete search history.

(56) References Cited

U.S. PATENT DOCUMENTS

| 4,633,079 A | 12/1986 | Rieger |
| 5,134,281 A | 7/1992 | Bryenton et al. |

(Continued)

FOREIGN PATENT DOCUMENTS

| CN | 101036045 A | 9/2007 |
| CN | 101151179 A | 3/2008 |

(Continued)

OTHER PUBLICATIONS

Chinese Search Report for Application CN 202080028597.4 dated Oct. 20, 2022, 2 pages.

(Continued)

*Primary Examiner* — Freddie Kirkland, III
(74) *Attorney, Agent, or Firm* — Howard & Howard Attorneys PLLC

(57) ABSTRACT

An optical fiber system for a body part of an anthropomorphic test device is disclosed that includes at least one body part and at least one optical fiber that has a plurality of cores in a spaced and helical relationship with one another that extend between ends of the optical fiber for sensing positions of the at least one body part. Each of the cores have a plurality of grating sensors disposed along a length thereof capable of determining a position and orientation of the body part.

29 Claims, 10 Drawing Sheets

(51) Int. Cl.
*G02B 6/02* (2006.01)
*G09B 23/32* (2006.01)

(56) References Cited

U.S. PATENT DOCUMENTS

| | | |
|---|---|---|
| 5,502,301 A | 3/1996 | Lord |
| 5,701,370 A | 12/1997 | Muhs et al. |
| 6,016,709 A | 1/2000 | Carnicelli et al. |
| 6,127,672 A | 10/2000 | Danisch |
| 6,381,069 B1 | 4/2002 | Riant et al. |
| 6,471,710 B1 | 10/2002 | Bucholtz |
| 6,575,757 B1 | 6/2003 | Leight et al. |
| 6,668,105 B2 | 12/2003 | Chen et al. |
| 6,816,266 B2 | 11/2004 | Varshneya et al. |
| 7,027,672 B2 | 4/2006 | Tjin |
| 7,043,997 B2 | 5/2006 | Mattson et al. |
| 7,086,273 B2 | 8/2006 | Lipmyer |
| 7,091,472 B1 | 8/2006 | Millar |
| 7,508,530 B1 | 3/2009 | Handman |
| 7,649,628 B2 | 1/2010 | Wadman |
| 7,702,190 B2 | 4/2010 | Hao et al. |
| 7,775,316 B2 | 8/2010 | Hosokawa et al. |
| 3,009,946 A1 | 8/2011 | Xia et al. |
| 8,086,430 B2 | 12/2011 | Thomas |
| 8,213,760 B2 | 7/2012 | Rudenick et al. |
| 8,244,088 B2 | 8/2012 | Putnam et al. |
| 8,672,684 B2 | 3/2014 | Ray |
| 8,700,358 B1 | 4/2014 | Parker, Jr. |
| 8,746,076 B2 | 6/2014 | Rogge et al. |
| 8,805,128 B2 | 8/2014 | Wild et al. |
| 8,909,040 B1 | 12/2014 | Parker, Jr. et al. |
| 8,970,845 B1 | 3/2015 | Chan et al. |
| 9,031,368 B2 | 5/2015 | Hayashi |
| 9,335,482 B2 * | 5/2016 | Hao ............. G08B 13/124 |
| 9,345,424 B2 | 5/2016 | Wang et al. |
| 9,355,575 B2 | 5/2016 | Wang |
| 9,360,635 B2 | 6/2016 | Barwicz et al. |
| 9,417,057 B2 | 8/2016 | Hooft et al. |
| 9,459,164 B2 * | 10/2016 | Arkwright ............ G01L 1/246 |
| 9,664,506 B2 | 5/2017 | Parker, Jr. et al. |
| 9,681,826 B2 | 6/2017 | Dunias et al. |
| 9,715,838 B2 | 7/2017 | Below et al. |
| 9,736,597 B1 | 8/2017 | Spiegelberg et al. |
| 10,946,827 B2 * | 3/2021 | Yoshikawa ........ B60R 21/2334 |
| 2001/0019103 A1 | 9/2001 | Sugai et al. |
| 2003/0083844 A1 | 5/2003 | Reddi et al. |
| 2004/0178330 A1 | 9/2004 | Tarvin et al. |
| 2004/0234218 A1 | 11/2004 | Tao et al. |
| 2005/0126258 A1 | 6/2005 | Lipmyer |
| 2006/0171646 A1 | 8/2006 | Putnam et al. |
| 2006/0215971 A1 | 9/2006 | Ramos |
| 2007/0058163 A1 | 3/2007 | Handman |
| 2007/0065077 A1 | 3/2007 | Childers et al. |
| 2007/0189352 A1 | 8/2007 | Nagahama et al. |
| 2007/0201793 A1 | 8/2007 | Askins et al. |
| 2008/0234898 A1 | 9/2008 | Wiener |
| 2008/0285909 A1 | 11/2008 | Younge et al. |
| 2009/0123111 A1 | 5/2009 | Udd |
| 2009/0324161 A1 | 12/2009 | Prisco |
| 2011/0109898 A1 | 5/2011 | Froggatt et al. |
| 2011/0239731 A1* | 10/2011 | Lisseman ............... G09B 23/30 |
| | | 73/12.01 |
| 2011/0245733 A1 | 10/2011 | Goldbeck et al. |
| 2011/0249252 A1 | 10/2011 | Lantz et al. |
| 2012/0186369 A1 | 7/2012 | Matlschweiger |
| 2013/0090552 A1 | 4/2013 | Ramamurthy et al. |
| 2013/0301998 A1 | 11/2013 | Hayashi |
| 2013/0327164 A1* | 12/2013 | Wang ................ G09B 23/30 |
| | | 73/866.4 |
| 2014/0053654 A1 | 2/2014 | Rogge et al. |
| 2014/0112615 A1 | 4/2014 | Kreger et al. |
| 2014/0326078 A1* | 11/2014 | Arkwright ........ G01K 11/3206 |
| | | 73/862.624 |
| 2015/0029511 A1 | 1/2015 | 'T Hooft et al. |
| 2015/0124266 A1 | 5/2015 | Davis et al. |

| | | |
|---|---|---|
| 2015/0230730 A1 | 8/2015 | Sabczynski et al. |
| 2017/0162077 A1 | 6/2017 | Vara et al. |
| 2017/0196479 A1 | 7/2017 | Liu et al. |
| 2017/0205291 A1 | 7/2017 | Shimada |
| 2017/0205297 A1 | 7/2017 | Rickman et al. |
| 2017/0354353 A1* | 12/2017 | Kim ..................... G01L 1/246 |
| 2018/0033339 A1 | 2/2018 | Kerins et al. |
| 2018/0128600 A1 | 5/2018 | Hooft |
| 2018/0160947 A1 | 6/2018 | Hu |
| 2018/0297214 A1 | 10/2018 | Lessing et al. |
| 2019/0017887 A1 | 1/2019 | Bovero et al. |
| 2019/0094459 A1 | 3/2019 | Froggatt et al. |
| 2020/0348193 A1 | 11/2020 | Vara et al. |
| 2022/0187146 A1* | 6/2022 | Ramos ................. G01L 1/246 |
| 2022/0252389 A1* | 8/2022 | Ramos ................. G09B 23/32 |

FOREIGN PATENT DOCUMENTS

| | | |
|---|---|---|
| CN | 101491433 A | 7/2009 |
| CN | 202582783 U | 12/2012 |
| CN | 103673791 A | 3/2014 |
| CN | 103674083 A | 3/2014 |
| CN | 104169678 A | 11/2014 |
| CN | 104236627 A | 12/2014 |
| CN | 104321673 A | 1/2015 |
| CN | 104736054 A | 6/2015 |
| CN | 104833525 A | 8/2015 |
| CN | 105136338 A | 12/2015 |
| CN | 105571620 A | 5/2016 |
| CN | 105755950 A | 7/2016 |
| CN | 106959077 A | 7/2017 |
| CN | 107015653 A | 8/2017 |
| CN | 107036543 A | 8/2017 |
| CN | 107249833 A | 10/2017 |
| CN | 108852361 A | 11/2018 |
| CN | 106610273 B | 3/2019 |
| DE | 19532945 A1 | 3/1996 |
| DE | 10215640 A1 | 11/2003 |
| DE | 10333735 A1 | 3/2005 |
| DE | 102013009815 A1 | 12/2013 |
| DE | 102013101432 A1 | 8/2014 |
| EP | 1710129 A2 | 10/2006 |
| EP | 2467692 A2 | 6/2012 |
| EP | 2245438 B1 | 4/2013 |
| EP | 2626006 A2 | 8/2013 |
| WO | 00068645 A1 | 11/2000 |
| WO | 2009061181 A1 | 5/2009 |
| WO | 2011066926 A1 | 6/2011 |
| WO | 2014101754 A1 | 7/2014 |
| WO | 2017118949 A1 | 7/2017 |
| WO | 2019147754 A1 | 8/2019 |
| WO | 2019147754 A4 | 10/2019 |

OTHER PUBLICATIONS

English language abstract for CN 101151179 A extracted from espacenet.com database on Nov. 23, 2022, 2 pages.
English language abstract for CN 104321673 A extracted from espacenet.com database on Nov. 23, 2022, 2 pages.
English language abstract for CN 105571620 A extracted from espacenet.com database on Nov. 23, 2022, 2 pages.
English language abstract for CN 106959077 A extracted from espacenet.com database on Nov. 23, 2022, 1 page.
English language abstract for CN 107249833 A extracted from espacenet.com database on Nov. 23, 2022, 2 pages.
Butz, Robert C. et al., "In-Fiber Bragg Grating Impact Force Transducer for Studying Head-Helmet Mechanical Interaction in Head Impact", Journal of Lightwave Technology, vol. 33, No. 13, Jul. 1, 2015, 8 pages.
Di Sante, Raffaella, "Fibre Optic Sensors for Structural Health Monitoring of Aircraft Composite Structures: Recent Advances and Applications", Sensors, vol. 15, Jul. 30, 2015, pp. 18666-18713.
English language abstract for CN 104833525 A extracted from espacenet.com database on Oct. 8, 2020, 1 page.
English language abstract for CN 106610273 B extracted from espacenet.com database on Oct. 8, 2020, 1 page.

(56) References Cited

OTHER PUBLICATIONS

English language abstract for CN 202582783 U extracted from espacenet.com database on Oct. 8, 2020, 1 page.
English language abstract for DE 102 15 640 A1 extracted from espacenet.com database on Oct. 11, 2021, 1 page.
English language abstract for DE 195 32 945 A1 extracted from espacenet.com database on Aug. 20, 2020, 1 page.
English language abstract for WO 2014/101754 A1 extracted from espacenet.com database on Sep. 1, 2021, 2 pages.
English language abstract not found for DE 10 2013 009 815 A1; however, see English language equivalent U.S. Pat. No. 9,355,575 B2. Original document extracted from espacenet.com database on Oct. 11, 2021, 11 pages.
European Search Report for Application EP 19 74 3262 dated Sep. 2, 2021, 2 pages.
HBM, "How Does an Optical Strain Guage Work?", 2018, 6 pages.
International Search Report for Application No. PCT/US2019/014878 dated Jun. 20, 2019, 1 page.
International Search Report for Application No. PCT/US2020/019042 dated May 11, 2020, 1 page.
International Search Report for Application No. PCT/US2020/019048 dated May 11, 2020, 1 page.
International Search Report for Application No. PCT/US2020/019078 dated May 5, 2020, 1 page.
Moore, Jason P. et al., "Shape Sensing Using Multi-Core Fiber Optic Cable and Parametric Curve Solutions", Optical Society of America, 2012, 7 pages.
Prosser, W.H. et al., "Structural Health Management for Future Aerospace Vehicles", https://ntrs.nasa.gov/search.isp?R=20040200975, 2004, 16 pages.
Reddy, M et al., "Imbedded Optical Fiber Sensor of Differential Strain in Composites", 1987, pp. 1241-1245.
Richards, Lance et al., "NASA Applications of Structural Health Monitoring Technology", Sep. 2013, 42 pages.
Talaia, Pedro Miguel de Almeida, "Motorcyclist Biomechanical Model", 2013, 249 pages.
Udd, Eric, "25 Years of Structural Monitoring Using Fiber Optic Sensors", Apr. 15, 2011, 9 pages.
U.S. Appl. No. 16/964,489, filed Jul. 23, 2020.
U.S. Appl. No. 17/432,226, filed Aug. 19, 2021.
U.S. Appl. No. 17/432,241, filed Aug. 19, 2021.
Westbrook, P.S. et al., "Distributed Sensing Over Meter Lengths Using Twisted Multicore Optical Fiber With Continuous Bragg Gratings", 2017, 9 pages.
Yu, Henry Y. et al., "A Test Bed to Examine Helmet Fit and Retention and Biomechanical Measures of Head and Neck Injury in Simulated Impact", Journal of Visualized Experiments, Issue 127, Sep. 21, 2017, 18 pages.
Chinese Search Report for Application CN 2020800285974 dated Apr. 3, 2023, 3 pages.
English language abstract and original document of Hu, Wenshan, "Progress in the Research on Robot's Sensitive Skin, Journal of Hefei University of Technology", Dec. 3, 2006, 4 Pages.
English language abstract and original document of Wang, Yan, "Dynamic Testing Based on FBG and Its Preliminary Application in the Artificial Skin", China Master's Theses, Information Technology Series, Feb. 1, 2016, 75 pages.
Chinese Search Report for Application CN 2019800189673 dated Jan. 10, 2023, 2 pages.
English language abstract for CN 103673791 A extracted from espacenet com database on Feb. 2, 2023, 2 pages.
English language abstract for CN 103674083 A extracted from espacenet.com database on Feb. 2, 2023, 2 pages.
English language abstract for CN 104236627 A extracted from espacenet.com database on Feb. 2, 2023, 2 pages.
English language abstract for CN 105755950 A extracted from espacenet.com database on Feb. 2, 2023, 2 pages.
Chinese Search Report for Application CN 2019800189673 dated Nov. 1, 2021, 2 pages.
English language abstract for CN 101036045 A extracted from espacenet.com database on Nov. 4, 2021, 2 pages.
English language abstract for CN 105136338 A extracted from espacenet.com database on Nov. 4, 2021, 1 page.
English language abstract for CN 107036543 A extracted from espacenet.com database on Nov. 4, 2021, 1 page.
English language abstract for DE 103 33 735 A1 extracted from espacenet.com database on Nov. 9, 2022, 1 page.
English Translation of German Office Action for Application DE 10 2013 009 815.7 dated Jun. 13, 2022, 16 pages.
English language abstract for CN 101491433 A extracted from espacenet.com database on Mar. 3, 2023, 2 pages.
English language abstract for CN 104169678 A extracted from espacenet.com database on Mar. 3, 2023, 1 page.
English language abstract for CN 104736054 A extracted from espacenet.com database on Mar. 3, 2023, 2 pages.
English language abstract for CN 107015653 A extracted from espacenet.com database on Mar. 3, 2023, 1 page.
English language abstract for CN 108852361 A extracted from espacenet.com database on Mar. 3, 2023, 1 page.
English language abstract for DE 10 2013 101 432 A1 extracted from espacenet.com database on Mar. 9, 2023, 1 page.
Chinese Search Report for Application CN 2020800285226 dated Feb. 2, 2023, 3 pages.
Chinese Search Report for Application CN 2020800286017 dated Feb. 18, 2023, 3 pages.
Amanzadeh, Moe et al., "Recent Developments in Fibre Optic Shape Sensing", Measurement, vol. 128, Nov. 2018, pp. 119-137.
European Search Report for Application EP 20 75 9871 dated Sep. 27, 2022, 2 pages.
European Search Report for Application EP 20 75 9172 dated Oct. 7, 2022, 2 pages.
Chinese Search Report for Application CN 2020800286017 dated Sep. 16, 2023, 3 pages.

* cited by examiner

OPTICAL FIBER SYSTEM HAVING HELICAL CORE STRUCTURE FOR DETECTING FORCES DURING A COLLISION TEST

RELATED APPLICATIONS

This application claims priority to U.S. Provisional Patent Application No. 62/808,039, filed on Feb. 20, 2019, which is hereby incorporated by reference.

BACKGROUND

1. Field of the Invention

The present invention relates generally to system for detecting forces during a collision test using anthropomorphic test devices and, more particularly, to an optical fiber system for body parts of an anthropomorphic test device.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle.

Collision testing often involves the use of anthropomorphic test devices (ATD), commonly referred to as "crash test dummies." The ATD is formed from a plurality of body parts that are connected to one another to simulate a human body. Each of the body parts comprise many discrete components that are intended to represent the articulation of the human body. In other words, many of the body parts are able to move, twist, and bend in multiple directions and in different manners. During collision testing, the ATD is placed inside a vehicle and the vehicle undergoes a simulated collision (sled test) or physical collision. The collision exposes the ATD to high inertial loading, and sensors inside the ATD, such as accelerometers, strain gauges, and other sensors, generate electrical signals of data corresponding to the loading. Cables transmit these electrical signals of data to a data acquisition system (DAS) for subsequent processing. This data reveals information about the effects of the collision on the anthropomorphic test device and can be correlated to the effects a similar collision would have on a human occupant.

The movement and distortions of the ATD during a crash test have also been monitored visually using high speed cameras in the past. However, some tests cannot be monitored in this way because of the construction of the structure surrounding the ATD, the presence of other dummies, or the inflation of air bags. Also, the position or shape of individual body parts of the ATD may be difficult to estimate, such as limbs and internal organs. Simulated soft organs are particularly difficult to monitor using traditional strain gauges where it is difficult to measure strain of low Young modulus materials using high Young modulus sensing elements.

To develop skeletal structures, organs, or flesh of the ATD, it is necessary to create or form shapes and materials to adjust for various possible stiffness, which the human body can have in different regions or components. To adjust these components, it is only possible to do this by changing geometry of the body parts or the ATD or using different materials, and adjusting as close as possible to the material stiffness requirement. These systems are time consuming to set-up and only represent certain aspects of the human body when subjected to forces.

The ATD is highly adjustable to allow for many different configurations. Thus, it is difficult to reposition the ATD into precisely the same position and orientation for subsequent tests. Cameras can be used to realign the ATD, but there is less certainty that the position and orientation is the same, especially for internal body parts, such as organs or bones, and body parts that are obstructed by other mounting hardware. If the position and orientation of the ATD differs between subsequent tests, the results may differ.

SUMMARY

Accordingly, the present invention provides a system for detecting forces during a collision test. The system comprises a plurality of components forming a part of at least one of a vehicle, a testing stand, and/or an anthropomorphic test device and at least one optical fiber supported by and in contact with at least one of the components with the optical fiber extending between a first end and a second end along a fiber axis. The optical fiber has a plurality of cores extending between the first and the second ends and each of the cores has a plurality of grating sensors inscribed integrally therein with the sensors spaced along a length between the first and the second ends. An emitter is in communication with the optical fiber for emitting a light having a predetermined band of wavelengths through the plurality of cores of the optical fiber that is reflected by the sensors and an interrogator is in communication with the optical fiber for detecting the reflected light from the plurality of grating sensors such that changes to the reflected light indicate a strain on the optical fiber. The plurality of cores are further defined as having at least one location along the respective length where the plurality of cores are helically wound about each other along the fiber axis.

The present invention also provides another system for detecting forces during a collision test. The system comprises a plurality of body parts forming an anthropomorphic test device and simulating at least a part of a human body with at least one first optical fiber supported by at least one of the body parts. The first optical fiber extends between a first end and a second end and has a plurality of cores extending between the first and the second ends. Each of the cores has a plurality of grating sensors inscribed integrally therein with the sensors spaced along a length between the first and the second ends. The system further comprises a plurality of components forming a part of at least one of a vehicle and/or a testing stand with at least one second optical fiber supported by at least one of the components. The second optical fiber extends between a first end and a second end and comprises a plurality of cores extending between the first and the second ends. Each of the cores has a plurality of grating sensors inscribed integrally therein with the sensors spaced along a length between the first and the second ends. An emitter is in communication with the first and the second optical fibers for emitting a light having a predetermined band of wavelengths through the plurality of cores of the first and second optical fibers that is reflected by the sensors. An interrogator is in communication with the first and the second optical fibers for detecting the reflected light from the plurality of grating sensors such that changes to the reflected light indicate a strain on optical fibers. The plurality of cores of at least one of the first and the second optical fibers are further defined as having at least one location along the respective length where the plurality of cores are helically wound about each other along the fiber axis.

The present invention further provides an anthropomorphic test device comprising at least one of body part simulating at least a part of a human body and at least one optical fiber supported by the at least one body part with the optical fiber extending between a first end and a second end. The optical fiber has a plurality of cores extending between the first and the second ends and each of the cores has a plurality of grating sensors inscribed integrally therewith along a length therein with the sensors spaced along a length between the first and the second ends. The plurality of cores are further defined as having at least one location along the respective length where the plurality of cores are helically wound about each other along the fiber axis.

One advantage of the present invention is that a new optical fiber system is provided for the body part of the anthropomorphic test device. The optical fiber system utilizes a multi-core optical fiber that is positioned throughout specific body parts of the ATD. The optical fiber is also small and lightweight minimizing interference with the test. The optical fibers are typically formed of a silica based fiber which is very stable and provides repeatable test results. The use of optical fiber as sensing elements has also the advantage of having the electronics remote from the location of sensing. Another advantage is that the optical fiber is insensitive to electromagnetic noise in the environment.

The subject invention allows the ATD to be used in tests other than a crash or collision test, including the drops, parachuting, spacecraft launches, etc., that require precise positioning of the body parts before the test and subsequent tests to ensure repeatability of the test and accuracy of the test results. The precise positioning is aided by the plurality of cores, which provides additional positional data for the various body parts. The plurality of cores also increases the sensitivity of the optical fiber and the system as a whole. Multiple cores placed side by side can be used for bend measurement and helically spaced cores can be used to detect rotation direction. A center core in a neutral axis of the optical fiber can be used for measurement or compensation of total strain or temperature. Optical fibers of the subject invention can be used for measuring strain of large displacement and/or associated velocity or acceleration of the body parts of the ATD. One possible way to measure displacement, deformation, shape or position using optical fibers according to the subject invention is by fixing a section of the optical fiber to a reference material and using a lever to induce localized torsion such that it enhances the effect of torsion in that section of the optical fiber.

One advantage of the new optical fiber system is that it measures stress, strain, and deformation of skeletal structures, organs, and flesh for the ATD to form components, which can vary in structure, material, and shape all at the same time. Yet another advantage of the present invention is that the biofidelity of ATDs in use today and in the future is improved due to better measurement of the structural strains, stress, and shapes due to the multi-core optical fiber. Still another advantage of the present invention is that the optical fiber system permits for better vehicle restraint evaluations to predict possible injury. Existing measurement systems rely on individual load cells placed within the ATD and the metal structure of the ATD inhibits the ability to take measurements with such load cells. The fiber optic measurement system can be routed through areas that current load cells cannot be placed. Further, the optical fibers are capable of being threaded through the metal structure to provide a complete analysis of the forces acting on the desired body part. Other existing systems rely on images taken by cameras at discrete points of impact which require substantial calculations and extrapolation to determine the forces. The subject invention overcomes these inaccuracies and provides measurements in real time.

Other features and advantages of the present invention will be readily appreciated, as the same becomes better understood, after reading the subsequent description taken in conjunction with the accompanying drawings.

DETAILED DESCRIPTION

Figure 1A:
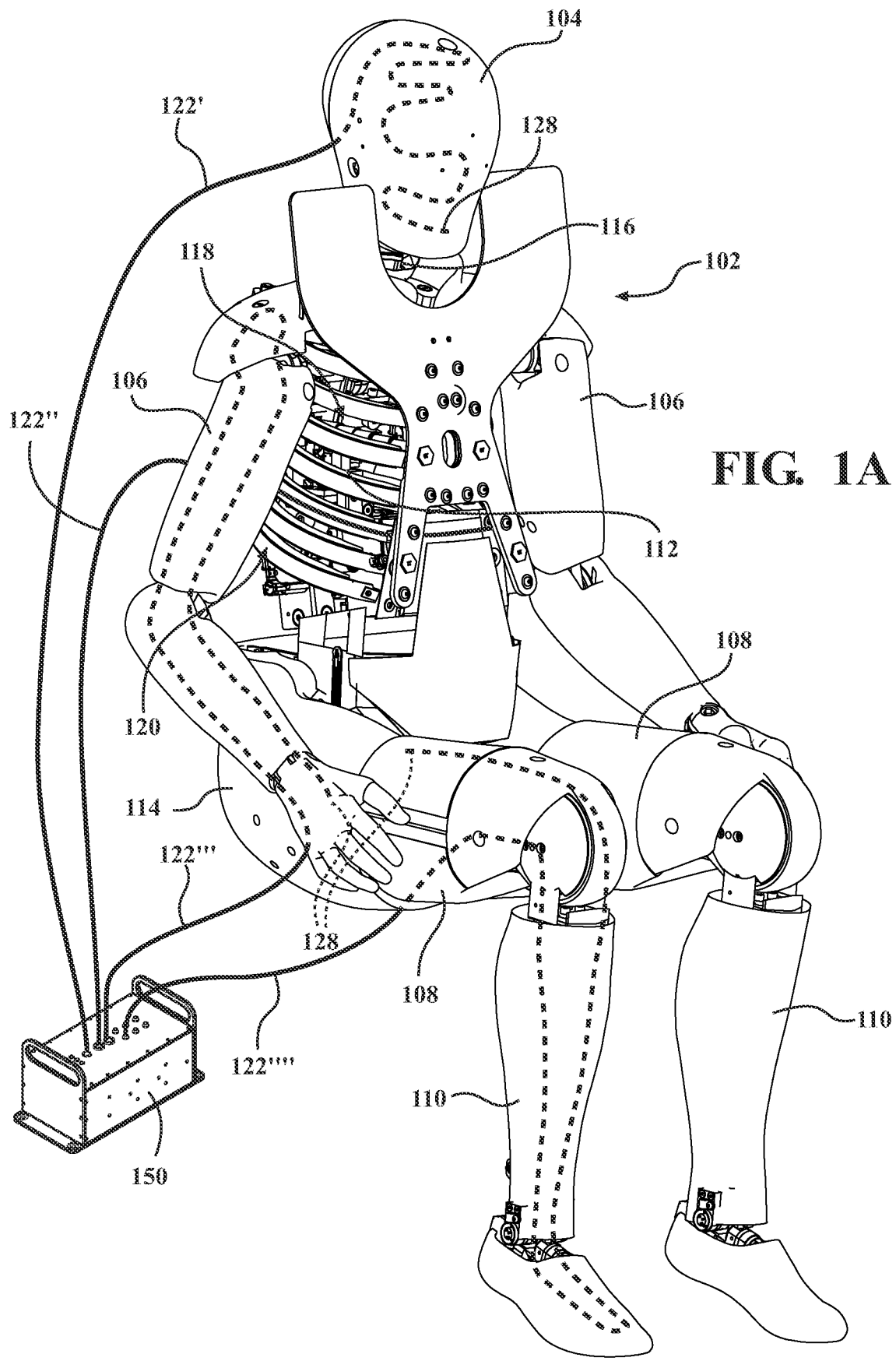
FIG. 1A is a perspective view of one embodiment of an optical fiber system, according to the present invention, having a plurality of body parts forming an anthropomorphic test (ATD) device with a plurality of optical fibers supported thereon.
Figure 1B:
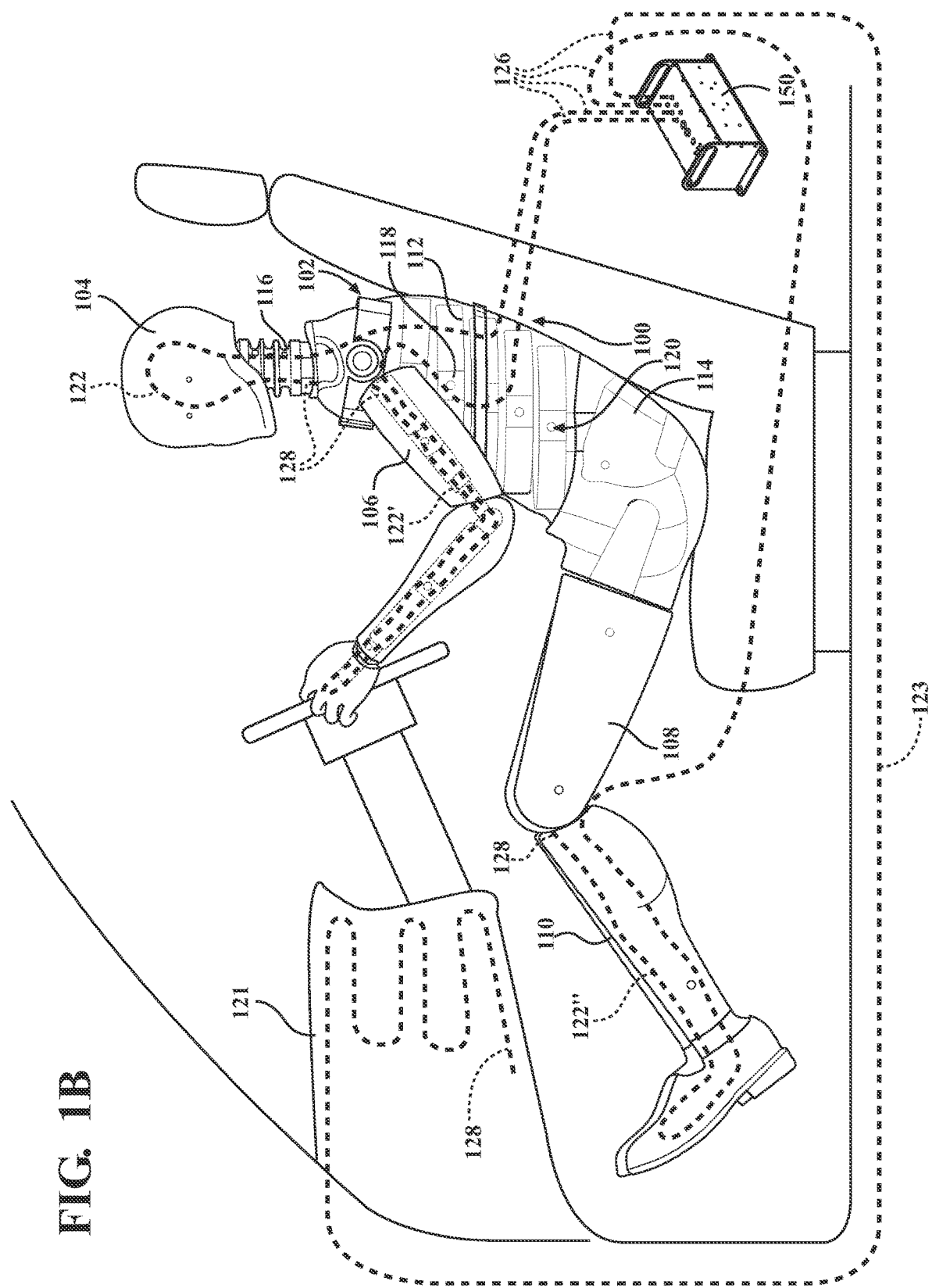
FIG. 1B is a side view of the optical fiber system shown in operational relationship with the ATD in a vehicle for undergoing a collision test.

Referring to the drawings and in particular FIG. 1A, one embodiment of an optical fiber system 100, according to the present invention, is shown in operational relationship with an anthropomorphic test device (ATD), generally indicated at 102. FIG. 1B shows the optical fiber system 100 in a vehicle for undergoing a collision test. The system 100 includes a plurality of body parts forming the anthropomorphic test device 102 and simulates at least a part of a human body. The body parts are capable of articulation to simulate movement of the human body. The optical fiber system 100, according to the present invention, includes at least one optical fiber 122 extending between first and second end 126, 128. The optical fiber 122 is supported by and in contact with at least one of the ATD or the vehicle.

The anthropomorphic test device 102, in the example shown in FIG. 1A, is of a fiftieth percentile (50%) male type and is illustrated in a sitting position. It should be appreciated that the optical fiber system 100 can be used with all types of ATD 102. The system 100 can be used to sense shape or position of the body parts such that the position can be maintained or precisely realigned for subsequent tests.

In one embodiment, the system 100 is used primarily, but without limitation, to test the performance of interiors and systems for seat occupants that undergo an impact or a crash. In another embodiment, the optical fiber system 100 can be used to test a plurality of components forming a part of at least one of a vehicle and a testing stand. This can also include specifically testing the performance of automotive interiors and restraint systems for adult front and rear seat occupants. Referring to automotive interior components, this may include seats, restraints, consoles, steering columns, steering wheels or any interior component subject to impact. Other vehicles that can be tested include, but are not limited to, airplanes and the associated interior components, which may include seats, restraints, hull, head liners, seat trays and the like.

The size and weight of the ATD 102 is based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data. The ATD 102 can also be used to test the force of impacts on a simulated human body directly in various testing stands, such as neck twist fixtures, chest impact fixtures, and the like. Similarly, the optical fiber 122 can be supported by and in contact with such testing stands to test impacts thereon.

Referring back to the ATD 102, the body parts typically include a rigid body part and a flexible body part. Rigid body parts of the ATD 102 are meant to mimic and/or simulate rigid body parts of a human body, such as bone. Flexible body parts are meant to mimic and/or simulate flexible body parts of the human body, such as flesh, muscle, tissue, organs, and the like. The ATD 102 combines rigid and flexible body parts to more accurately represent the human body. For example, an arm assembly includes the rigid body part corresponding to the bones and the flexible body part corresponding to the flesh, muscle, and tissue. Referring to the flexible body parts, it should be appreciated that various materials, such as a urethane or plastic can be used to form the flexible body parts for improved coupling with the rigid body parts of the anthropomorphic test device.

As shown generally in FIGS. 1A and 1B, the ATD 102 includes a head assembly 104, a right and left arm assembly 106, a right and left upper leg assembly 108, a right and left lower leg assembly 110, a thorax assembly 112, and a pelvis assembly 114. An instrumentation core may be mounted within the various body parts and may be removable for access to the body part. It should be appreciated that the right and left assemblies are generally constructed in a similar manner. It is to be appreciated by one of ordinary skill in the art that the individual components forming the ATD 102 are well known and can be varied based on the particular ATD 102 without deviating from the subject invention.

FIG. 1A also shows a neck assembly 116 that connects the head assembly 104 to the thorax assembly 112. The thorax assembly 112 also includes a spine assembly 118 having an upper end mounted to the head assembly 104 and a lower end extending into a torso area of the ATD 102. The thorax assembly 112 also includes a rib cage assembly 120 connected to the spine assembly 118. In FIG. 1A, one optical fiber 122' is disposed in the head assembly 104, either as embedded or surface mounted and another optical fiber 122" is wrapped around a rib 124. However, the rib 124 can also be tested as a standalone body part to determine the response to various impacts. The optical fiber 122" directly contacts the rib 124 for sensing stain thereon. Still another optical fiber 122''' is disposed in the arm assembly 106, and yet still another optical fiber 122'''' is disposed in the lower leg assembly 110. It is to be appreciated that the optical fibers can all have the same configuration or each may be different while still practicing the subject invention. Further, the optical fiber 122 could be one continuous fiber throughout the entire ATD 102 even though it is shown as discrete fibers. The optical fiber 122 may mount directly to a surface of the body part or is embedded within the body part. It is to be appreciated that mounting can be achieved with adhesive, glue, tape, or the like. It is to be appreciated that embedding the optical fiber can be achieved by various methods as such as by molding or casting the body part around the optical fiber. It is also possible that the body part could be 3D printed about the optical fiber or vice versa.

Figure 2:
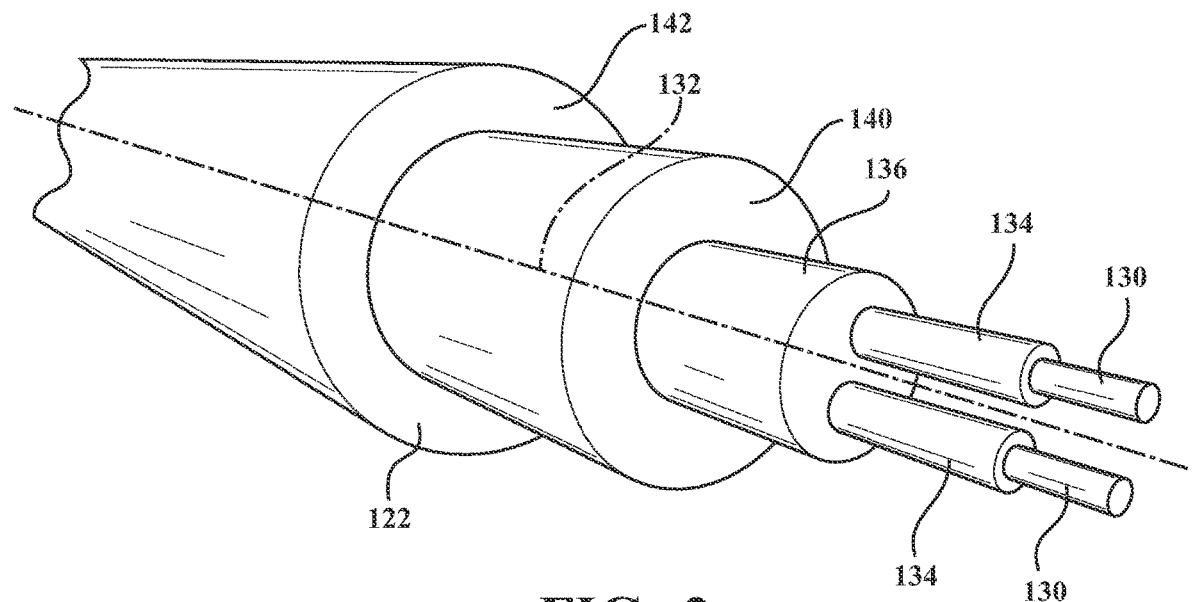
FIG. 2 is a partial cut away, perspective view of an optical fiber for use in the optical fiber system of the subject invention.

Referring to FIG. 2, the optical fiber 122 has a plurality of cores 130, i.e. multiple cores 130 that extend between the first and the second end 126, 128. The optical fiber 122 further defines a longitudinally extending fiber axis 132. The plurality of cores 130 may include one core located along the fiber axis, such as a central core, and other cores spaced from the central core, such as satellite cores. Alternatively, the plurality of cores 130 could include only the satellite cores. The plurality of cores 130 are in a spaced and helical relationship with one another such that at least one location along the respective length the plurality of cores 130 are helically wound about each other along the fiber axis 132. The helical relationship of the cores 130 may be at distinct locations throughout the optical fiber 122 or may extend throughout, i.e. the plurality of cores 130 are helically wound continuously between the first and the second ends 126, 128.

A coating material 136 surrounds the cladding material 134 to provide strength to the core 130 and cladding material 134. Optimally, although not necessarily, a strength member 140 and an outer jacket 142 may also surround the coating material 136 to provide additional strength to the optical fiber 122. However, it is to be appreciated that the various layers may depend on the configuration of the plurality of cores 130.

Figure 3:
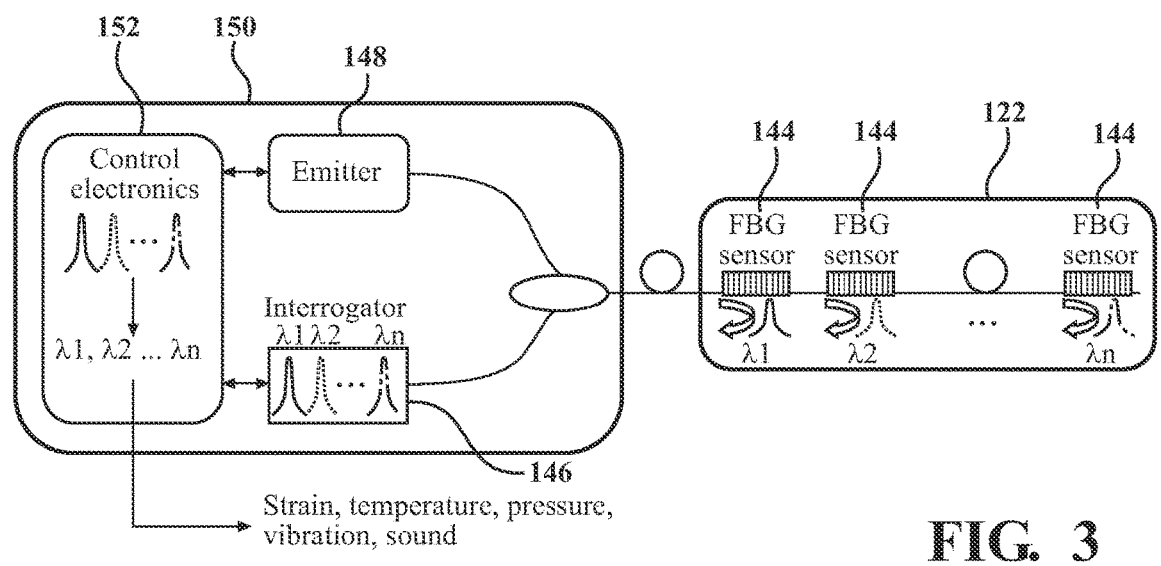
FIG. 3 is a schematic view of the optical fiber in communication with a control box according to one embodiment of the subject invention.

A schematic view of the system 100 is shown in FIG. 3 in communication with one of the cores 130. Each of cores 130 has a plurality of grating sensors 144 disposed along a length thereof such that the system 100 is capable of determining a position and orientation of the body parts. It is to be appreciated by one of ordinary skill that the grating sensors 144 are generally a longitudinal variation in the refractive index of the core 130. The number of grating sensors 144 can be selected based on the particular body part. For example, the optical fiber 122 can have from 7 to 25 sensors 144 disposed between the ends. Other embodiments can have up to 100 sensors 144 per core 130. The sensors 144 may be located near joints, such as elbow, hip, shoulder, knee, or ankle joint. For certain body parts, the sensors 144 may be disposed equidistance from one another along the optical fiber 122 and about the body part. For other body parts, the sensors 144 may be more closely located to one another. The plurality of grating sensors 144 may be located where the plurality of cores 130 are helically wound about each other. Further, the plurality of grating sensors 144 of each of the cores 130 may be co-planar with one another where the plurality of cores 130 are helically wound about each other. The spacing of the grating sensors 144 determine the particular wavelength that will be reflected by the grating sensor 144. It is well known that each grating sensor 144 has its own period and thereby its own unique reflection wavelength, so that each sensor can be distinguished by the detected reflection.

The system 100 includes an interrogator 146 communicating with the optical fiber 122 and an emitter 148 in communication with the optical fiber 122 for emitting a light having a predetermined band of wavelengths through the optical fiber 122 that is reflected by the sensors 144. The interrogator 146 and emitter 148 send out light in different wavelengths in this band so that it covers a wide spectrum. The light propagates through the optical fiber 122, is reflected at some point by the sensors 144 and returns to the interrogator 146. The sensors 144 have different periods so it is possible to distinguish between the signals of different sensors. The actual strain and, in turn, the stress on the body part can be deduced from the light signals which return from the sensors 144. The detection of strain could be provided by Fiber Bragg Gratings (FBGs), Brillouin scattering, Rayleigh scattering, interferometers, or any other optical technique as is known to those of skill in the art. Although the grating sensors 144 are described as integral with the optical fiber 122, it is to be understood by one of ordinary skill in the art that optical time domain reflectometry (OTDR) could be used with Brillouin or Rayleigh scattering to achieve the subject invention by using a time of pulse to determine the location of the strain.

The subject invention may enclose the interrogator 146 and the emitter 148 within a control box (shown generally at 150 in FIGS. 1 and 2). The control box 150 may also house a controller 152. A suitable control box 150, emitter 148, and interrogator 146 are disclosed in co-pending Application PCT/US19/14878, filed Jan. 24, 2019, which is incorporated herein by reference. As one example, the emitter 148 emits the light having a predetermined band wavelength that is from 50 to 450 nanometers. In one embodiment, the wavelength band can be in the range of 1510-1595 nanometers. In another embodiment, the wavelength band can be in the range of 1275-1345 nanometers. In still another embodiment, the wavelength band can be in the range of 780-850 nanometers. It is also possible that the wavelength band is suitable for red diode lasers. It is to be appreciated that these wavelength bands are exemplary and are not intended to limit the subject invention.

The control box 150 is coupled to the optical fiber 122 and the light from the emitter 148 is reflected by the sensors 144. The reflected light can be used to determine the forces, such as strain, experienced by the optical fiber 122, and ultimately determine the amount of deformation to the body part. In other words, when the optical fiber 122 is placed on the body part in an initial condition, the sensors 144 reflect a certain pattern of the light. When forces are applied to the body part, the optical fiber 122 is subjected to stress or strain which causes the sensors 144 to undergo a change, such as by expanding or contracting. Expanding or contracting the sensors 144 change the reflected light pattern. As one example, the changes in the reflected light pattern are detected, which can then be compared to known changes to determine the amount of movement or deformation of the body part. The forces that are applied may deform the body part and/or the optical fiber 122. The forces may also include changes within the environment, such as temperature or pressure, which may cause changes to the optical fiber 122 sufficient to alter the reflected light pattern. However, in collisions tests, the subject invention undergoes significant deformation in a very short time span, i.e. in an impact simulation. The deformation causes significant strain on the optical fiber 122 resulting in areas that are stretched and others that are compressed. Further, the system 100 undergoes repeated deformations.

Figure 4:
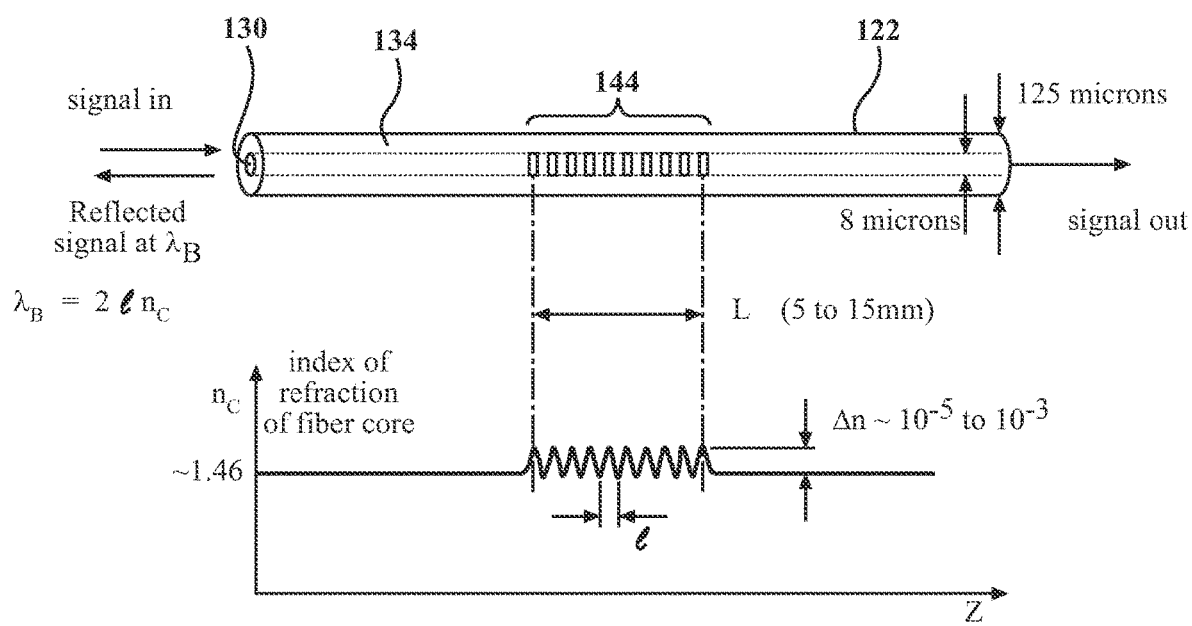
FIG. 4 is a schematic view of the optical fiber according to one embodiment of the subject invention.

Referring to FIG. 4, another schematic view of one of the optical fibers 122 and the sensor 144 are shown having light directed down the core 130 that is reflected by the Fiber Bragg Grating as is understood by those of ordinary skill in the art. The sensor 144 has a length L and the light has a wavelength 1. The core 130 has an index of refraction, nc that is selected for the particular application. It is well known to one of ordinary skill in the optical fiber arts to correlate the reflected light from the sensor 144 using the wavelength 1, length L, and index of refraction nc. The optical fiber 122 may have a diameter of from 30 to 1000 microns. In one embodiment, the optical fiber 122 has a diameter of from 100 to 300 microns. Each of the cores 130 may have a same diameter or different diameters. In one embodiment of the system 100, each of said cores 130 has a diameter of from 2 to 900 microns. In another embodiment, each of the cores has a diameter of from 2-300 microns. Alternatively, the core 130 would typically have a diameter of less than 30 microns, and particularly from 5-20 microns. One preferred optical fiber 122 has a core 130 with a diameter of about 8 microns. The cladding material 134 is typically about 75-200 microns and particularly from 100-150 microns. In another embodiment, the optical fiber 122 has a diameter of from 100 to 200 microns. The optical fiber 122 can be sized for the particular body part. One common diameter for the optical fiber 122 is about 75-150 microns.

Figure 5:
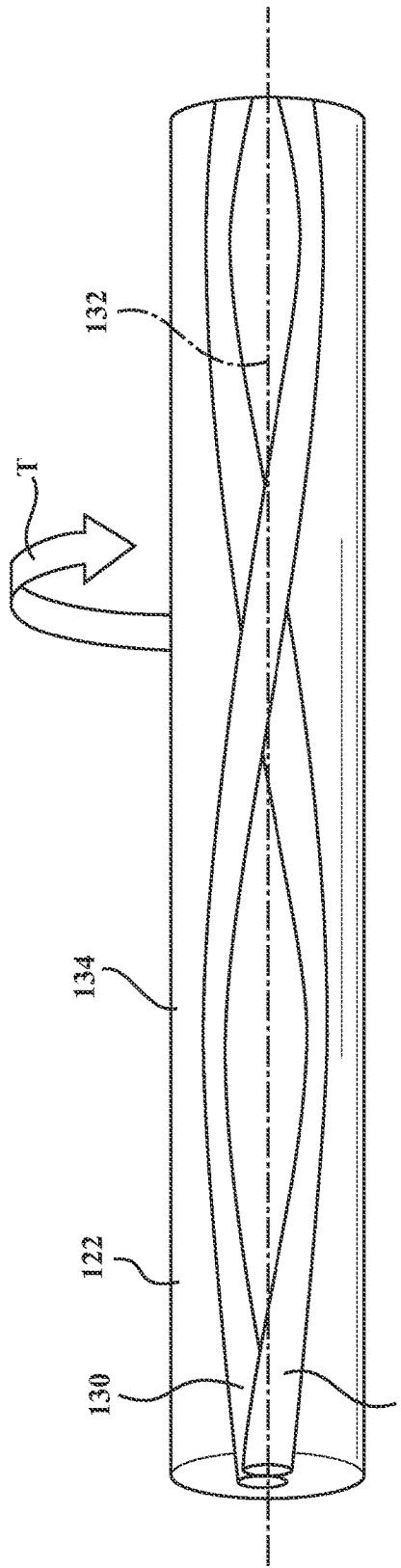
FIG. 5 is a perspective view of one embodiment of an optical fiber according to the subject invention.

The subject invention provides that the optical fiber 122 would enable the precise shape, position and movements of the ATD 102 to be tracked in real time. FIG. 5 is a perspective view of the cores 130 and cladding material 134 of the optical fiber 122 shown in FIG. 2. The two cores 130 are twisted helically along the main axis 132 of the optical fiber 122. A similar effect can be obtained by twisting two optical fibers having a single core and attaching them to each other, i.e. as a bundle of collocated fibers. When the optical fiber 122 is subjected to torsion T, the cores 130 will experience tensile strain if the torsion is applied in the same direction as the original twist and the cores 130 will experience compressive strain if the torsion is in the opposite direction to the original twist. By measuring strain in the individual cores, it is possible to measure torsion of the optical fiber system 100. In this embodiment, the amount of the torsion is able to be determined, but the direction of the torsion is not known.

Figure 6B:
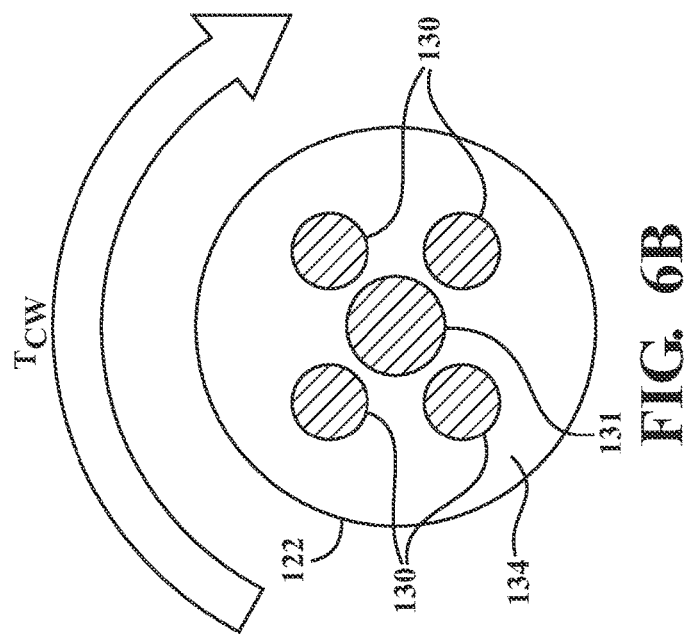
FIGS. 6A and 6B are end views of another embodiment of an optical fiber for use with the subject invention.
Figure 6A:
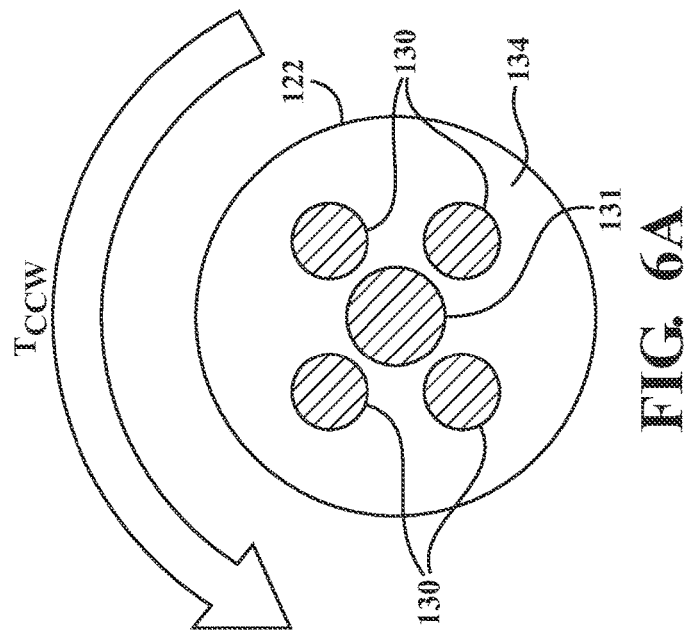

Referring to FIG. 6A, a cross-sectional view of another embodiment of the optical fiber 122 is shown having five cores 130. The optical fiber 122 has one centrally located core 131 along the axis 132 and has a larger diameter and the other cores 130 are placed around the center core 131. The use of a center core 131 may be desirable to allow for measurement of strain in the neutral axis 132 of the optical fiber 122. A counter clockwise torsion, Tccw, is applied to the optical fiber 122 and the center core 131 allows for a direction of the torsion to be determined. FIG. 6B shows show a clockwise torsion, Tcw, applied to the optical fiber 122.

Figure 7:
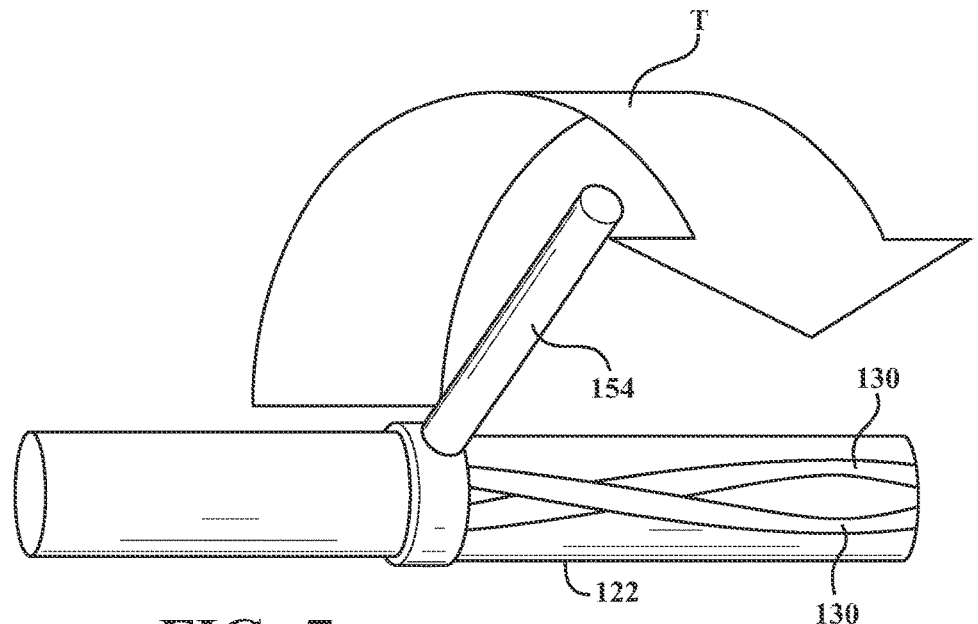
FIG. 7 is a partial cross-sectional, perspective view of still another embodiment of an optical fiber having a lever for use with the subject invention.
Figure 8:
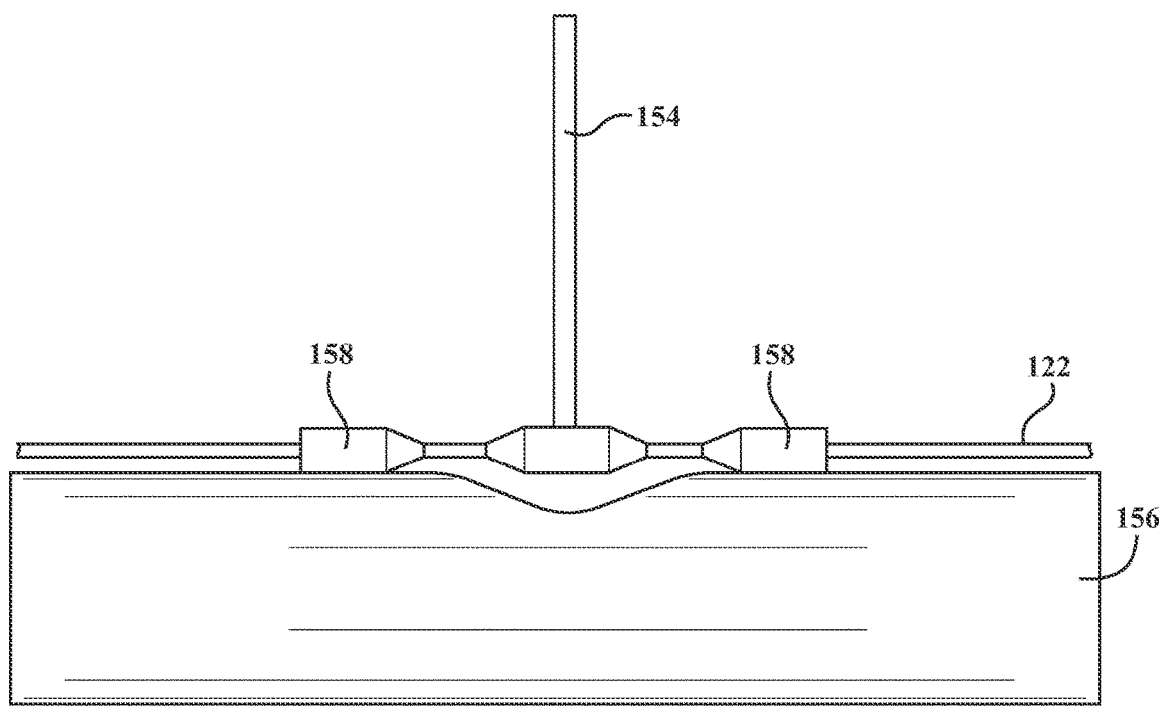
FIG. 8 is a side of view of an embodiment of an optical fiber having a lever for use with the subject invention.

FIG. 7 is a perspective view of the optical fiber 122 having a lever 154 attached to the optical fiber 122 that may be used to translate displacement into torsion T. FIG. 8 shows the optical fiber 122 that is fixed to a reference material 156, such as one of the body parts of the ATD 102. The optical fiber 122 is fixed at points 158 to the reference material 156 and the lever 154 extends from the optical fiber 122 such that a concentration of torsion strain can be created between the two points 158. Displacement at the end of the lever 154 applies force on the cores 130 to twist or untwist. The subject invention allows the sensors 144 along these points to detect the strain caused by the force. One of ordinary skill in the art can use a transfer function to translate the strain measurements into displacement of the lever 154.

Figure 9:
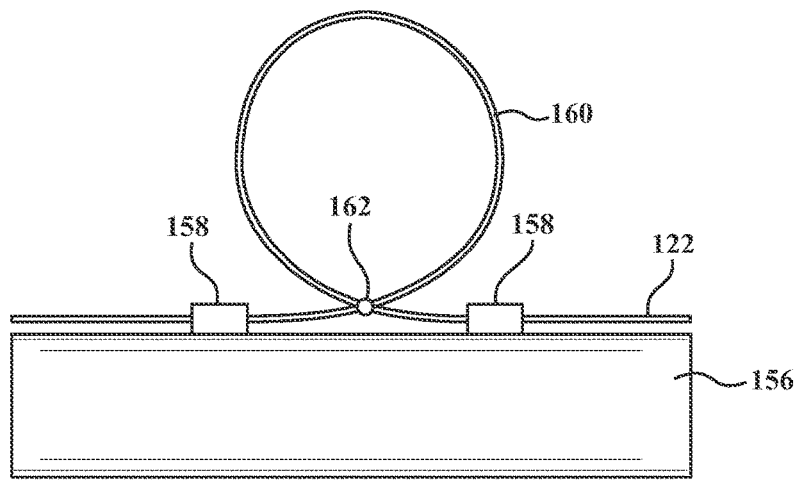
FIG. 9 is a side view of another embodiment of an optical fiber forming a lever for use in the subject invention.
Figure 10:
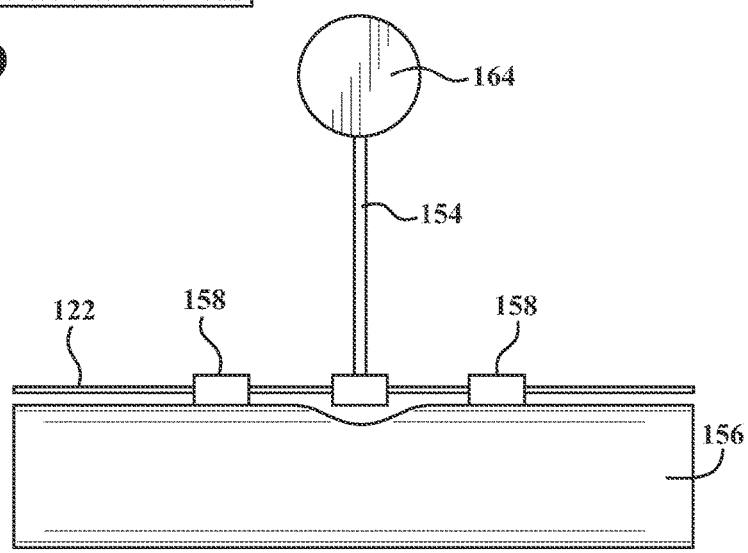
FIG. 10 is a side view of a lever having a mass engaging an optical fiber for use in the subject invention.
Figure 11:
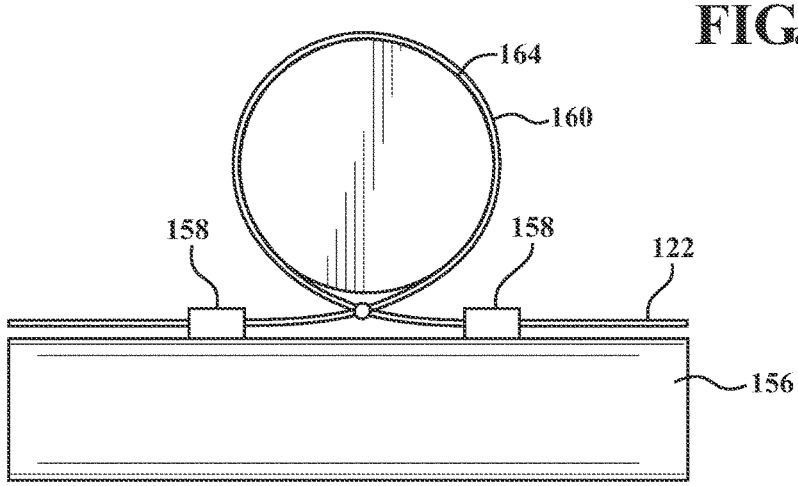
FIG. 11 is a side view of one embodiment of an optical fiber forming a lever and having a mass attached for use in the subject invention

FIG. 9 shows another embodiment of the optical fiber 122 having a loop 160 that is acting as the lever 154. The optical fiber 122 is fixed at points 158, such as by an adhesive material 162 to keep the loop 160 closed. The loop 160 can be fixed to the reference material 156 similarly as before. Movement of the loop 160 induces torsion strain on the optical fiber 122 which can be detected optically as discussed above. FIG. 10 is yet another embodiment of the optical fiber according to the subject invention that can be used to detect velocity or acceleration, which can be translated into torsion. The optical fiber is fixed at points 158 and the lever 154 extends from the optical fiber 122. A mass 164 is added to the lever 154 such that variation in displacement of the reference material 156 in relation to the inertial mass 164 can be translated into torsion. FIG. 11 shows an alternate embodiment having the mass 164 added to the loop 160 for determining the torsion. The use of optical fiber 122 as sensor and spring simultaneously gives the advantage of being simple to make and capitalizes on the high stability of silica as the material.

Figure 12:
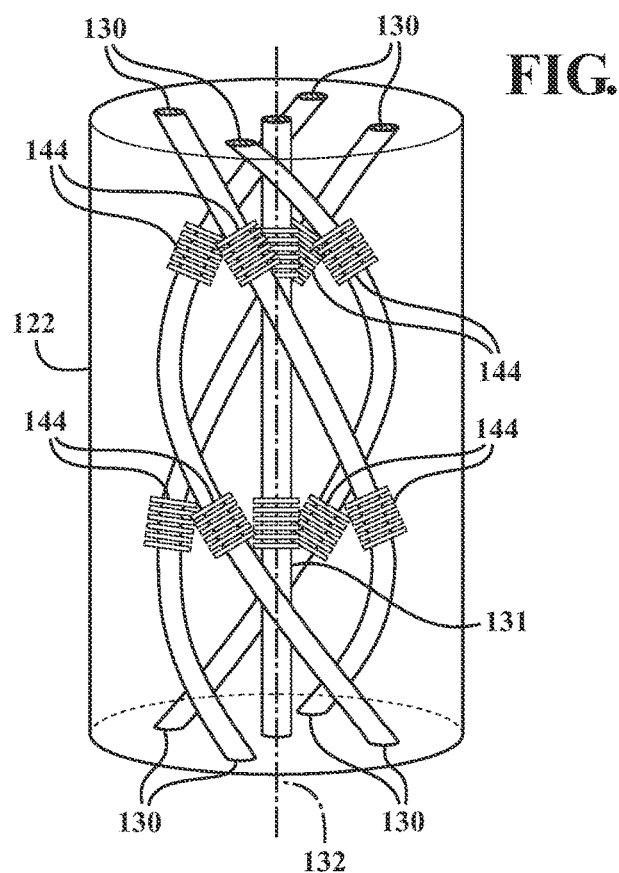
FIG. 12 is a side view of another embodiment of an optical fiber.

With reference to FIG. 12, a side view of one embodiment of the optical fiber 122 is shown. The optical fiber 122 has the sensors 144 as fiber Bragg Gratings (FBGs) written in different cores 130. The sensors 144 of each of the cores 13 are shown as co-planar with one another.

FIGS. 13-17 illustrate embodiments of the subject invention used to determine the position and movement of joints in the ATD 102. It is to be appreciated that the subject invention could be used to monitor any of the joints present in the ATD using a single or multiple optical fibers 122 to link all the sensing points. Further, more than one rotation or torsion addition can be used for a single joint.

Figure 13:
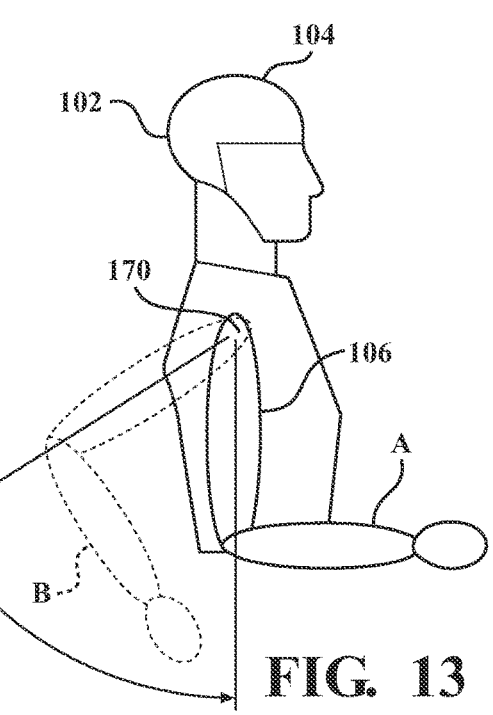
FIGS. 13-17 are side views of body parts of an anthropomorphic test device undergoing a deformation or change through rotation is detectable with the subject invention.
Figure 14:
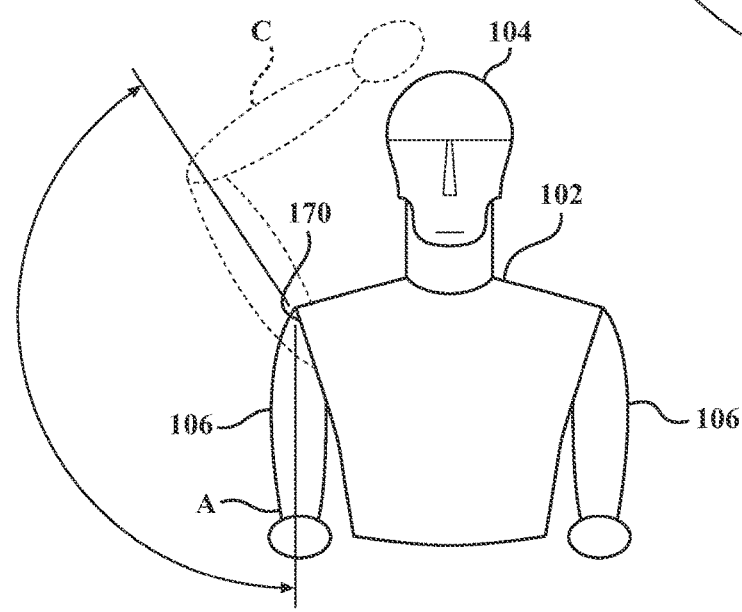
Figure 15:
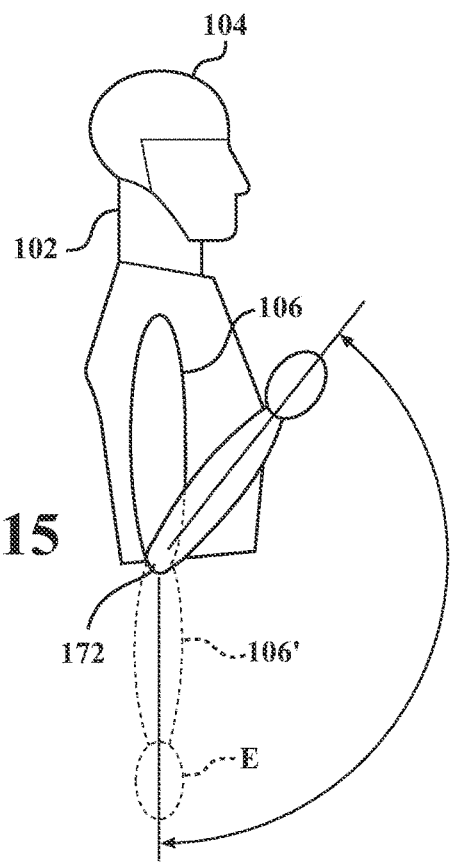

In a particular example, the bending and rotation of arms and legs could be monitored by attaching the substrate and the lever to different parts of a joint. In FIG. 13, a side perspective view of the ATD 102 is shown with the arm assembly 106 in a starting position A. As the ATD 102 is subjected to forces or accelerated, the arm assembly 106 moves to position B about a shoulder joint 170 in at least one plane. The subject invention is able to sense the precise position, including rotation, of the arm assembly 106 about the shoulder joint 170. Referring to FIG. 14, the arm assembly 106 moves about the shoulder joint 170 in a different plane to a position C. FIG. 15 is a side perspective view of the ATD 102 shown with the arm assembly 106 in a starting position D, and as the ATD 102 is subjected to forces or accelerated, the arm assembly 106 moves to position E about an elbow joint 172. The subject invention is able to sense the precise position, including rotation, of the arm assembly 106 about the elbow joint 172.

Figure 16:
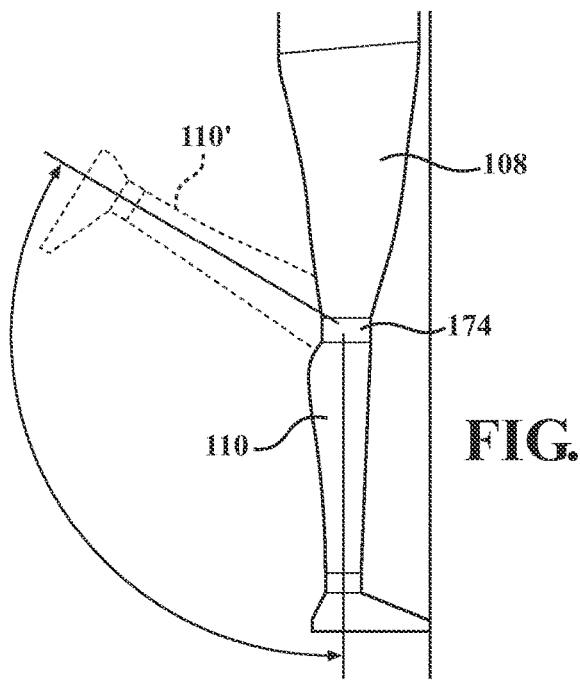
Figure 17:
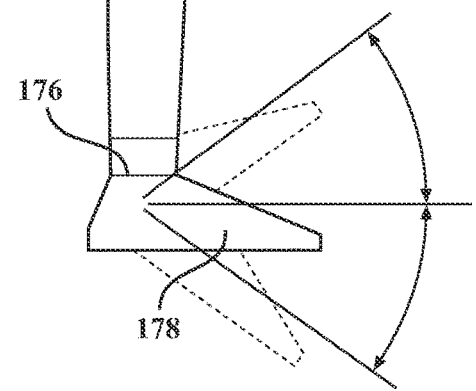

With reference to FIG. 16, the upper leg assembly 108 and the lower leg assembly 110 are shown in a starting position F and the lower leg assembly is moved to position G. The optical fiber system 100 of the subject invention is able to detect the rotation about a knee joint 174. FIG. 17 shows the lower leg assembly 110 having a foot 178 pivoting about an ankle joint 176.

The subject invention allows shape information to be extracted from differential strain measurements from the different cores 130. In one embodiment, the optical fiber 122 has a length that extends through the body parts of the ATD 102. Preferably, the length is sufficient that one optical fiber 122 can extend through the head, neck, arm, thorax, pelvis and upper and lower leg assemblies. Alternatively, each of the body parts can receive its own optical fiber 122. For example, the shape sensing can be used to detect the position of each limb, head, body or organs in relation to the spine or in relation to the surrounding environment which could be a car or a seat. The subject invention is capable of undergoing significant deformation in a very short time span, i.e. in an impact simulation. The deformation causes strain on the optical fiber 122 resulting in areas that are stretched and others that are compressed. Further, the system 100 undergoes repeated deformations.

The sensing system 100 can be attached to parts of the ATD 102 such as neck, spine, joints, internal organs, bones, ribs or any part. Referring back to FIG. 1A, the optical fiber 122 is placed throughout different parts to monitor the shape thereof by sensing different parts such as torso, limbs and head. Thus, the subject invention allows for the precise positioning of the body part prior to subjecting the ATD 102 to a test or any movements. Once a starting position and orientation of the body parts are known, the body parts can be repositioned in the same position and orientation for subsequent tests. The subject invention also allows for the detection of bending of joints, such as elbows, knees, or neck, before, during, and after a test. The ability to repeatedly place the body parts in the correct or same position before the test and for subsequent test is import and the present invention would considerably aid this operation.

Figure 18:
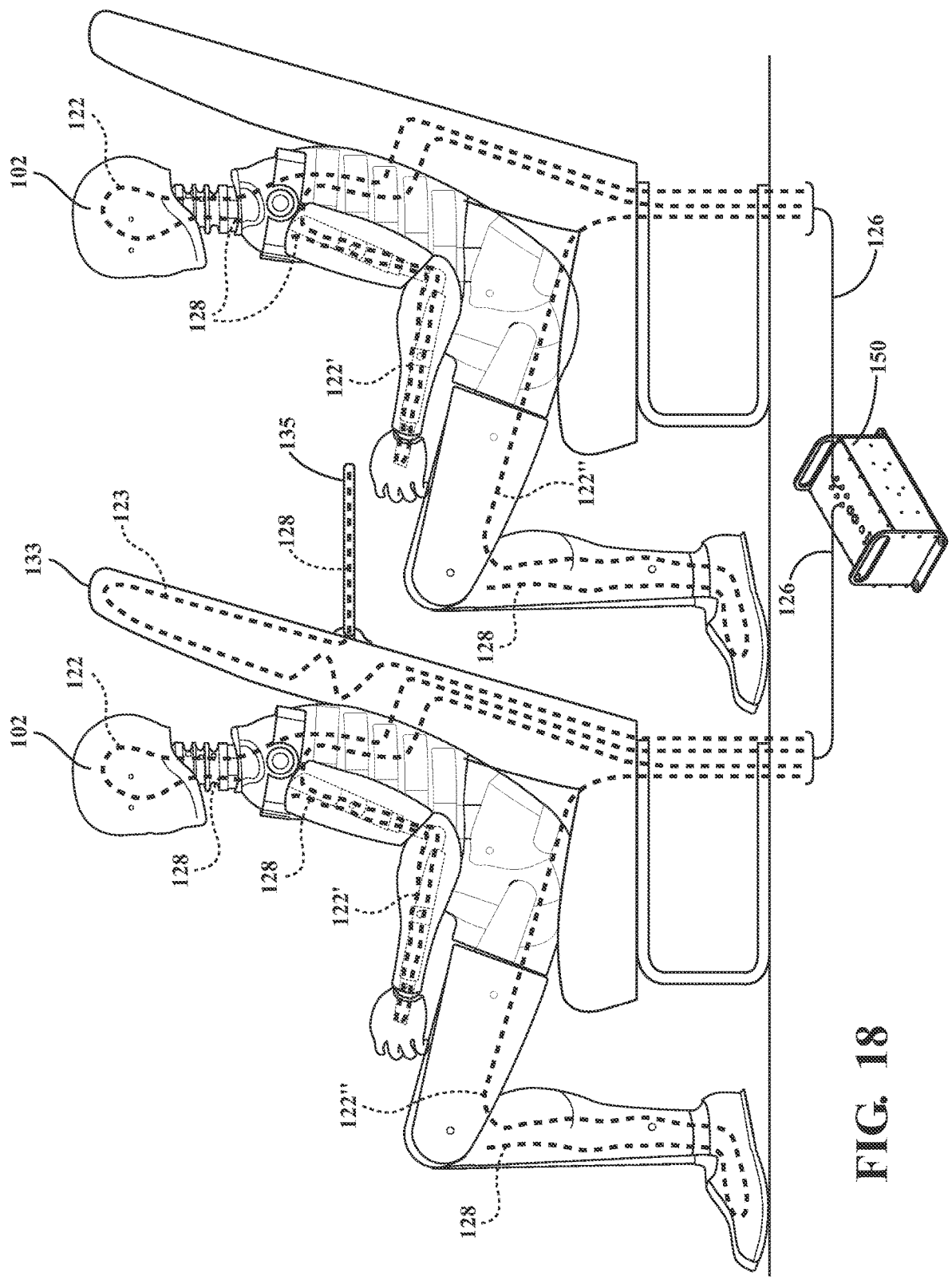
FIG. 18 is a perspective view of another embodiment of an optical fiber system, according to the present invention.

Referring to FIG. 1B, a second optical fiber 123 is disposed in the interior component, such as a dashboard 121. Another embodiment is shown in FIG. 18 for use in testing airplane interiors with two ATDs 102, which are the same as shown in FIG. 1B. Each of the ATDs 102 has first optical fibers 122, 122', 122" extending throughout the body parts. The second optical fiber 123 extends through a seat back 133 and tray table 135. Each of the first optical fibers, 122, 122', 122" and the second optical fiber 123 include the fiber cores 130 with grating sensors 144 as discussed above.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A system for detecting forces during a collision test where the system undergoes a sudden impact causing deformation in a short time span, said system comprising:

a plurality of components forming a part of at least one of a vehicle, a testing stand, and/or an anthropomorphic test device, wherein at least one of said plurality of components includes a joint between adjacent components;

at least one optical fiber supported by and in contact with at least one of said components with said optical fiber extending between a first end and a second end along a fiber axis, said at least one optical fiber extending across said joint and is fixed at a plurality of points adjacent said joint;

said optical fiber having a plurality of cores extending between said first and said second ends, each of said cores having a plurality of grating sensors inscribed integrally therein with said sensors spaced along a length between said first and said second ends;

an emitter in communication with said optical fiber for emitting a light having a predetermined band of wavelengths through said plurality of cores of said optical fiber that is reflected by said sensors; and an interrogator in communication with said optical fiber for detecting said reflected light from said plurality of grating sensors such that changes to the reflected light indicate a strain on said optical fiber;

wherein said plurality of cores are further defined as having at least one location along said respective length where said plurality of cores are helically wound about each other along said fiber axis and wherein said location extends across said joint such that movement at said joint causes strain on said optical fiber that stretches and compresses said grating sensors thereby changing the reflection of the light from each of said plurality of cores that is used to measure torsion of said plurality of components about said joint.

2. A system as set forth in claim 1 wherein said plurality of cores are helically wound continuously between said first and said second ends.

3. A system as set forth in claim 1 wherein said plurality of grating sensors are located where said plurality of cores are helically wound about each other.

4. A system as set forth in claim 3 wherein said plurality of grating sensors of each of said core are co-planar with one another where said plurality of cores are helically wound about each other.

5. A system as set forth in claim 3 wherein said plurality of cores includes at least three cores.

6. A system as set forth in claim 5 wherein one of said cores is located along said fiber axis to detect a direction of torsion applied to said optical fiber with said other cores helically wound about said axis.

7. A system as set forth in claim 3 further comprising a lever extending from said optical fiber at said at least one location to translate displacement into torsion of said optical fiber.

8. A system as set forth in claim 3 further comprising a lever extending from said optical fiber between said fixed points.

9. A system as set forth in claim 8 wherein said lever is further defined as a loop of said optical fiber to detect torsion strain on said optical fiber.

10. A system as set forth in claim 8 wherein said lever further comprises a mass supported by said lever.

11. A system as set forth in claim 1 wherein said plurality of grating sensors is further defined as Fiber Bragg Grating sensor.

12. A system as set forth in claim 1 wherein said plurality of cores are further defined as being spaced from one another.

13. A system for detecting forces during a collision test where the system undergoes a sudden impact causing deformation in a short time span, said system comprising:

a plurality of body parts forming an anthropomorphic test device and simulating at least a part of a human body;

at least one first optical fiber supported by at least one of said body parts, said first optical fiber extending between a first end and a second end along a fiber axis, said first optical fiber comprising a plurality of cores extending between said first and said second ends, each of said cores having a plurality of grating sensors inscribed integrally therein with said sensors spaced along a length between said first and said second ends;

a plurality of components forming a part of at least one of a vehicle and/or a testing stand; at least one second optical fiber supported by at least one of said components, said second optical fiber extending between a first end and a second end along a fiber axis, said second optical fiber comprising a plurality of cores extending between said first and said second ends and each of said cores having a plurality of grating sensors inscribed integrally therein with said sensors spaced along a length between said first and said second ends;

an emitter in communication with said first and said second optical fibers for emitting a light having a predetermined band of wavelengths through said plurality of cores of said first and second optical fibers that is reflected by said sensors; and an interrogator in communication with said first and said second optical fibers for detecting said reflected light from said plurality of grating sensors such that changes to the reflected light indicate a strain on said optical fibers;

wherein said plurality of cores of at least one of said first and said second optical fibers are further defined as having at least one location along said respective length where said plurality of cores are helically wound about each other along said fiber axis; and wherein deformation of either of said body part and said component causes strain on said first or said second optical fiber that stretches and compresses said grating sensors thereby changing the reflection of the light from each of said plurality of cores that is used to measure torsion thereof.

14. A system as set forth in claim 13 wherein said plurality of cores are helically wound continuously between said first and said second ends.

15. A system as set forth in claim 13 wherein said plurality of grating sensors are located where said plurality of cores are helically wound about each other.

16. A system as set forth in claim 15 wherein said plurality of grating sensors of each of said core are co-planar with one another where said plurality of cores are helically wound about each other.

17. An anthropomorphic test device that undergoes a sudden impact causing deformation in a short time span, said anthropomorphic test device comprising:

at least one of body part simulating at least a part of a human body that may undergo deformation when subjected to the sudden impact;

at least one optical fiber supported by and in contact with said at least one body part with said optical fiber extending between a first end and a second end along a fiber axis; and said optical fiber having a plurality of cores extending between said first and said second ends and each of said cores having a plurality of grating sensors inscribed integrally therewith along a length therein with said sensors spaced along a length between said first and said second ends;

wherein said plurality of cores are further defined as having at least one location along said respective length where said plurality of cores are helically wound about each other along said fiber axis; and wherein deformation of said body part causes strain on said optical fiber that stretches and compresses said grating sensors thereby changing the reflection of the light from each of said plurality of cores that is used to measure torsion of said body parts.

18. A device as set forth in claim 17 wherein said plurality of cores are helically wound continuously between said first and said second ends.

19. A device as set forth in claim 17 wherein said plurality of grating sensors are located where said plurality of cores are helically wound about each other.

20. A device as set forth in claim 19 wherein said plurality of grating sensors of each of said core are co-planar with one another where said plurality of cores are helically wound about each other.

21. A device as set forth in claim 19 wherein said plurality of cores includes at least three cores.

22. A device as set forth in claim 19 wherein one of said cores is located along said axis to detect a direction of torsion applied to said optical fiber with said other cores helically wound about said fiber axis.

23. A device as set forth in claim 19 wherein said at least one optical fiber further comprises a fiber bundle of collocated optical fibers adjacent one another with each of said collocated optical fibers having at least one core.

24. A device as set forth in claim 23 wherein said collocated optical fibers are attached to each other.

25. A device as set forth in claim 19 wherein said optical fiber is embedded within said body part.

26. A device as set forth in claim 19 wherein said optical fiber is surface mounted to said body part.

27. A device as set forth in claim 19 wherein at least one of said cores has a different diameter of said other cores.

28. A device as set forth in claim 19 wherein said at least one body part is further defined as one of a head assembly, a leg assembly, or a rib.

29. A device as set forth in claim 19 further comprising a lever extending from said optical fiber to translate displacement into torsion of said optical fiber.

\* \* \* \* \*